United States Patent

[11] 3,543,671

[72] Inventors Donald J. Pendzimas
Minneapolis;
Theodore J. Rees, St. Paul, Minnesota
[21] Appl. No. 798,638
[22] Filed Feb. 12, 1969
[45] Patented Dec. 1, 1970
[73] Assignee P&R Corporation
Minneapolis, Minnesota

[54] FOOD COOKER
44 Claims, 12 Drawing Figs.
[52] U.S. Cl. .................................................. 99/333,
99/386, 99/404
[51] Int. Cl. ....................................................... A47j 27/14
[50] Field of Search........................................ 99/404,
405, 406, 355, 331, 399, 410, 416, 443, 325 326,
386, 393, 402, 327, 328, 333

[56] References Cited
UNITED STATES PATENTS

| | | | |
|---|---|---|---|
| 2,147,335 | 2/1939 | Fazi.............................. | 99/404 |
| 2,556,808 | 6/1951 | Harris........................... | 99/423 |
| 2,614,485 | 10/1952 | Sinkwitz...................... | 99/404 |
| 2,967,474 | 1/1961 | Ford............................. | 99/404 |
| 3,036,513 | 5/1962 | Reeves ......................... | 99/404 |
| 3,225,681 | 12/1965 | Wells............................ | 99/336 |
| 3,269,954 | 1/1967 | Haub............................ | 252/182 |

Primary Examiner—Robert W. Jenkins
Attorney—Craig, Antonelli, Stewart and Hill

ABSTRACT: The present disclosure is directed to a cooking apparatus for cooking and/or flavoring articles of food, for example raw meat, particularly frozen raw meat, in a cooking liquor. The apparatus generally comprises a cabinet adapted to contain a cooking liquor said cabinet being provided with a conveying means containing elements for holding said food articles and means for conveying said elements through said cooking liquor.

FIG. I

INVENTORS
DONALD J. PENDZIMAS
THEODORE J. REES

BY Craig, Antonelli, Stewart H. Hill

ATTORNEYS

FOOD COOKER

BACKGROUND OF THE INVENTION

The present invention relates to an apparatus for preparing and flavoring articles of food in a cooking liquor. More particularly, the present invention is directed to the cooking and flavoring of various kinds of meats in a cooking liquor in a short period of time.

Many different kinds of apparatus for cooking articles of food by conveying said food through a cooking environment are well known. The various apparatus differ greatly depending generally on their intended use, particularly with respect to the kind of food being processed. For example, when cooking meat, such as beef, pork, fowl, fish and the like, the meat is frequently subjected to a preliminary baking or preheat treatment under controlled conditions so that on demand, the meat can be finish-cooked to order and in a relatively short time. Thus the meat can be kept at a desired temperature and under a controlled atmosphere, for example, a flavor-generating atmosphere, for an indeterminate length of time and then transferred to a broiler where the meat is subjected to fairly high temperatures and is finish-broiled rapidly to the desired state. However, such apparatus require long processing or cooking times and frequently the food thus processed lacks the freshly cooked taste, and has a high shrinkage rate.

Another well-known kind of meat cooking apparatus comprises a rotary deep fat fryer which has a number of individual baskets adapted to be submerged and removed from a cooking well containing hot fat, so that the complete cooking cycle is achieved without the bother of manually removing the baskets from the deep fat. This device is particularly adapted to cooking portions or pieces of food, for example chicken legs and the like.

Other various types of cooking machines include rotisserie-type barbecue broilers wherein the meat is rotated in the presence of and cooked by a source of radiant heat; doughnut cookers wherein the doughnuts are conveyed in a hot cooking liquor and ejected from the apparatus fully cooked; and waffle cookers in which the waffle is cooked on a mold in deep grease.

In all of the known types of cooking apparatus, particularly meat cooking devices, nowhere is there any suggestion of an apparatus which prepares and/or flavors articles of food, particularly various kinds of meat, which is particularly adaptable for use in the preparation of sandwiches.

SUMMARY OF THE INVENTION

An object of the present invention is to avoid the prior art disadvantages in the preparing and/or flavoring of articles of food, particularly in the cooking and/or flavoring of various kinds of meat.

Another object of the present invention is to provide a meat cooking and/or flavoring apparatus particularly adapted to cooking sandwich portions of meat, wherein the meat is cooked in a short period of time with little loss of meat due to its shrinkage during the cooking process.

A further object of the present invention is to provide a meat cooking apparatus which flavors the meat while it is being cooked, said meat being used to prepare a moist sandwich.

A still further object of the present invention is to provide a meat cooking apparatus which cooks very thinly sliced meat while preventing said slices from crumbling during the cooking process, thereby producing a better appearing sandwich.

Still another object of the present invention is to provide a meat cooking apparatus which cooks raw meat, including frozen raw meat, to a ready to serve meat portion for use in a meat sandwich in a short period of time.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the above-mentioned disadvantages may be eliminated and a much improved apparatus for the cooking and/or flavoring of articles of food, particularly sandwich portions of meat, may be obtained by utilizing the apparatus disclosed hereinbelow.

The apparatus of the present invention comprises a carrousellike element rotatably mounted in a cabinet and extending above the upper surface of said cabinet. The carrousel contains a plurality of food racks which form part of a rider assembly which is slidably mounted to guide rods. During the cooking operation, the food racks, each containing a sandwich portion of meat, are lowered into an annular cooking well which extends below the upper surface of the cabinet. The cooking well contains the cooking liquor in which the meat is cooked and/or flavored. For adding and removing food, for example meat, to and from the cooking cycle, the food racks are raised out of the cooking well above the upper surface of said cabinet. In addition to the cooking well, the cabinet also houses the necessary elements for rotating the carrousel, raising the food racks and heating the flavoring and/or cooking liquor disposed in the cooking well. The carrousel containing the meat racks is attached to an axially disposed main drive shaft which is driven by a motor disposed in the lower portion of the cabinet. The raising of the food racks is effected by a push rod in cooperation with a jack shaft assembly or by a guide ramp. The heating of the cooking liquor is provided by at least one and advantageously a plurality of heaters which communicate directly or indirectly with the cooking liquor.

The operation of the cooking apparatus of the present invention can be described as follows: A sandwich portion of raw meat, for example sliced beef which may or may not be frozen, is placed on an extended face of the food rack, the other face of said rack being fixed in a substantially vertical position. Both faces of the food rack are designed to provide maximum contact of the meat with the cooking and/or flavoring liquor. Thus, the faces of the food rack can be designed as perforated plates, expanded metal plates or for example, as elements containing serpentine sections or horizontal and vertical bars. At the beginning of the cooking cycle the rack containing the meat is lowered into the cooking well containing the cooking liquor and submerged in said liquor. The cooking liquor can be, for example, a solution which adds flavor and color to the meat while the latter is being cooked. As the meat is lowered into the cooking well the extended face of the food rack is forced into close proximity to the fixed vertical face thereof so that the meat is held between the two faces of said food rack. The meat is then conveyed through the cooking liquor, for example in a circular path, until it is removed therefrom by a vertically operating push rod or by a guide ramp which engages the rider assembly and raises the food rack attached to said rider assembly from the cooking liquor. As the meat is raised from the cooking well, the extended face of the food rack which was held in a substantially closed position in the cooking well begins to open until it reaches a stop. The food rack may be held in the raised position by a spring clip or hook associated with the top of the carrousel which engages the upper arm of the rider assembly or it may be held in the raised position by a guide ramp. The cooked raw meat can then be removed from the food rack and replaced with a fresh portion of raw meat.

The apparatus of the present invention is particularly adapted to cooking raw frozen meat which has been sliced fairly thin, for example to a thickness of about three sixty-fourths of an inch. The carrousel is normally provided with a fixed rotational speed; for example about 2 minutes and 45 seconds per rotational cycle when cooking beef. The cooking time will vary depending on the particular kind of meat product being cooked, its thickness and the like. For example, the cooking time for beef from the raw, frozen state to a completely cooked state is about 2 minutes. Similarly, the temperature of the cooking liquor varies somewhat depending upon the substance being cooked. For example, the temperature of the cooking liquor for beef is controlled between about 195° and 205° F., advantageously about 200° F. Liquor temperatures higher than 205° F. frequently result in excessive loss of the liquor due to boiling, whereas liquor temperatures lower than 195° F. require an increase in the cooking time. As can be readily understood, the temperature of the liquor can be controlled to produce a cooked product within a desired time cycle. The temperature of the meat before its introduction into the cooking liquor can be varied from say about 0°J —35° F. and even higher in some instances. After completion of the cooking cycle the internal temperature of the meat is about 90° F. to 110° F. whereas the external temperature of the meat can be as high as 180° F. and even higher. The temperature of the meat after the completion of the cooking cycle is significant since sandwich portions of said meat are immediately placed in a bun which is in turn enclosed in a wrapper where tie meat is finish-cooked by the latent heat of the meat.

The meat cooking apparatus of the present invention exhibits many desirable features in the cooking and/or flavoring of sandwich portions of meat. For example, little shrinkage takes place during the cooking of beef. Thus one might reasonably expect a shrinkage of about 5 to 20 percent depending on the length of the cooking cycle and the grade of the beef. Also, the better grades of beef which contain a higher fat content exhibit the highest amount of shrinkage. This limited shrinkage can cut food costs up to about 50 percent. Also, the cooking liquor can be a solution which can be flavored in any desired manner. Thus the meat can be flavored while cooking, by flavoring the solution. Flavored solution may also add color to the meat.

Because the meat, for example beef slices, is held in a food rack while it is being cooked and because of the fast cooking time, that is about 2 minutes, the cooked meat is produced in slices rather than crumbles of meat. This of course produces a more attractive sandwich which is very moist and accordingly, more tasteful. The apparatus of the present invention further permits the use of lower grades of beef because the meat is not dried out and cooking meat rare, for example, form 90° F. to 110° F., results in a more tender product. Not only are lower grades of meat more economical, said grades also exhibit less shrinkage because of their low fat content.

Because the cooking process of the present invention is mechanized, consistent results in the cooked product are readily obtained. In addition, the apparatus of the present invention is easy to operate, requiring only a single operator per machine, requires no skill, saves time and can be used to process a variety of foods, particularly meat, such as for example, beef, pork, corn beef, fowl and the like.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
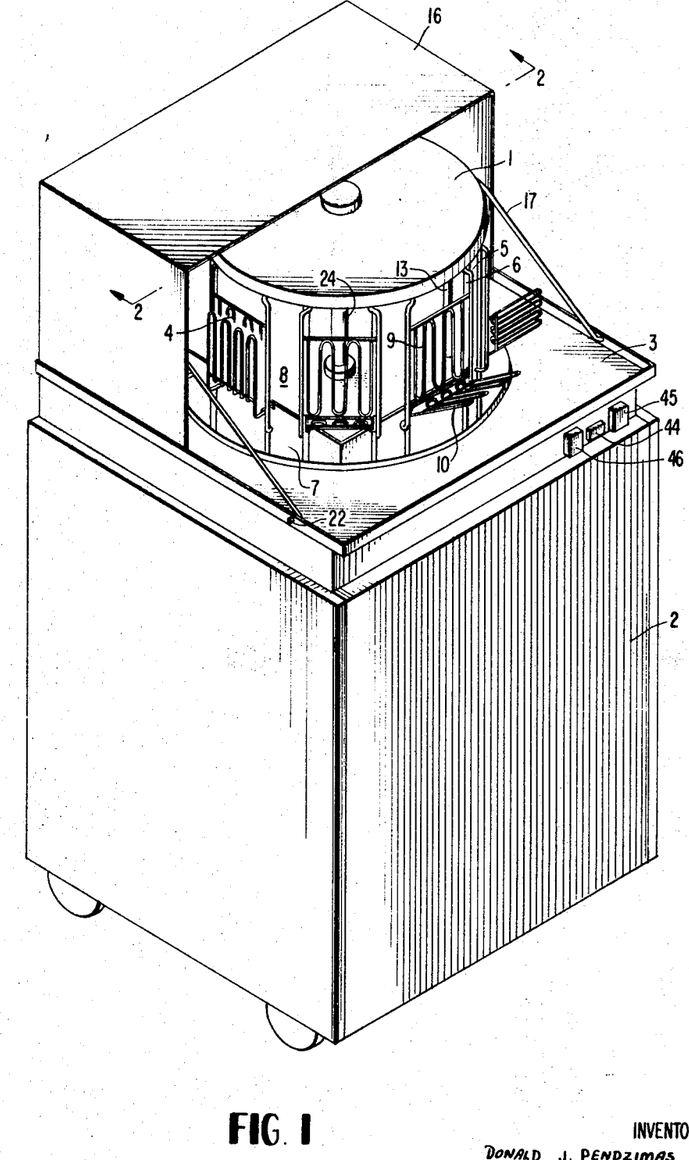
FIG. 1 is a perspective view of the cooking apparatus of the present invention.
Figure 2:
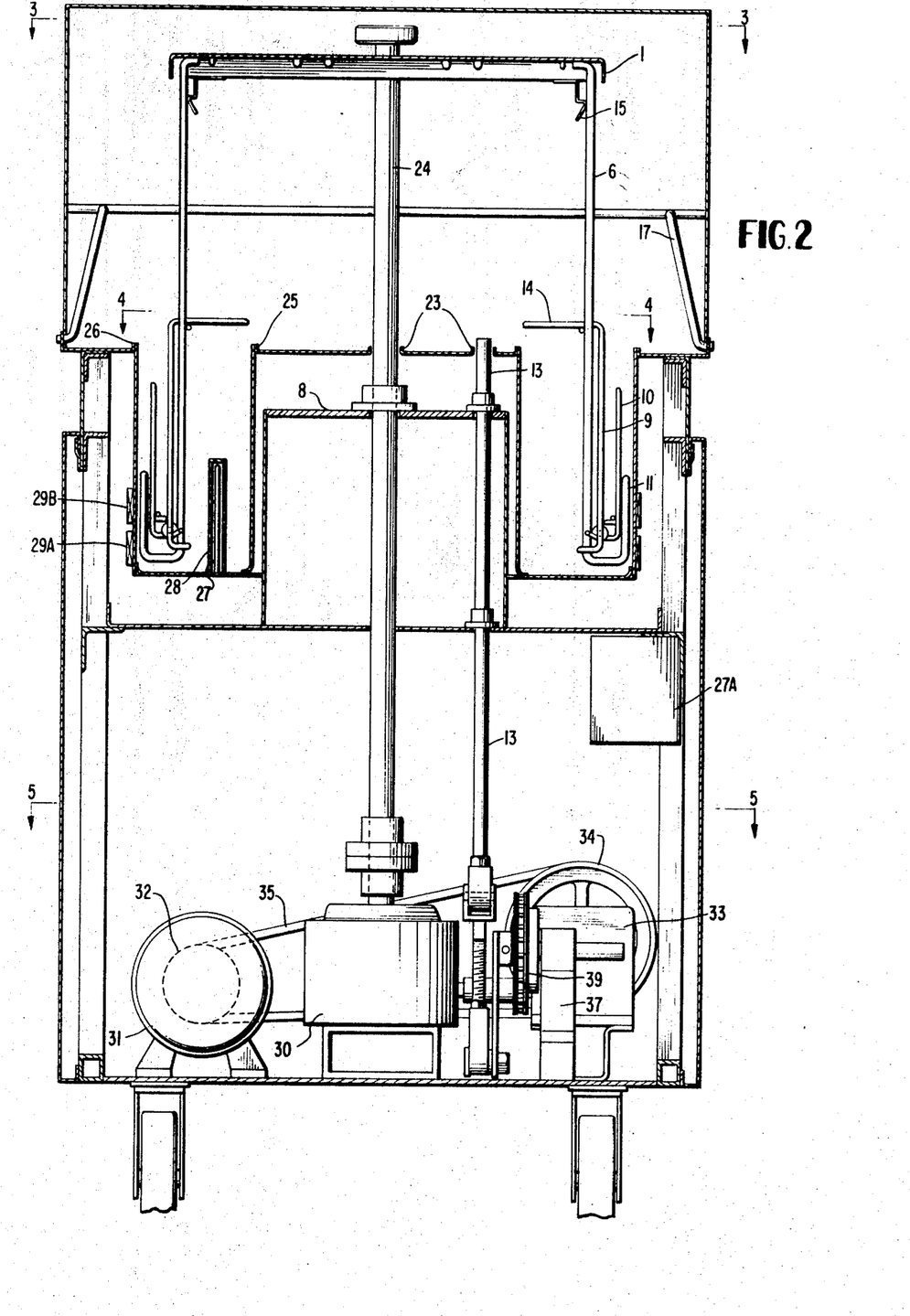
FIG. 2 is a sectional elevation view of the cooking apparatus of the present invention, taken along line 2—2 for FIG. 1.

Referring now to the drawings, and particularly to FIGS. 1 and 2 wherein like reference numerals are used throughout the various views to designate like parts, the apparatus of the present invention comprises a carrousellike element 1 rotatably mounted in a cabinet 2 and extending above the upper surface or table 3 of said cabinet. The carrousel 1 is provided with a plurality of food racks 4 which form part of a rider assembly 5 which is slidably mounted to a guide rod assembly 6. During the cooking operation, the food racks 4, each containing, for example, a sandwich portion of meat, are lowered into an annular cooking well or channel 7 defined by the inner walls of an aperture provided in table 3 and the walls of a centrally disposed tray 8. The tray can be designed in any shape, for example round, rectangular, square, domed, etc. although in the preferred embodiment of the present invention, as shown in the drawings, the cooking tray is square thereby providing an increase in the mass of cooking liquor which effects a better temperature stability of said liquor over the full capacity of the machine. For example, when using a round tray with a diameter equal to diagonal of the square, the cooking well accommodates only about 4 gallons of cooking liquor and would tend to experience difficulty in holding its temperature over a long period of time at various operational capacities when compared to using a square tray which enables the cooking well to hold about 7 gallons of the cooking liquor.

Figure 4:
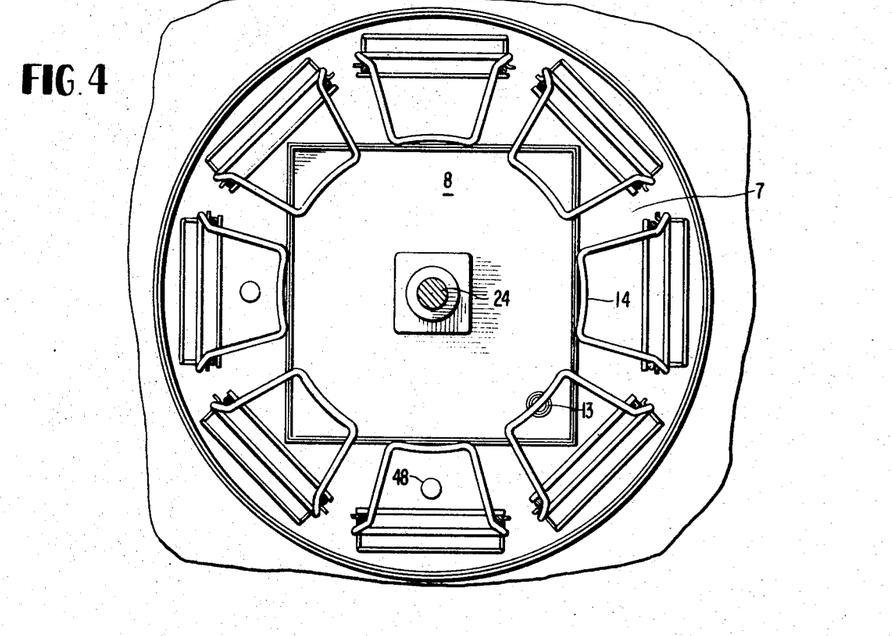
FIG. 4 is a sectional plan view of the rider assembly of the apparatus of the present invention taken along line 4—4 of FIG. 2.
Figures 6, 7, 8:
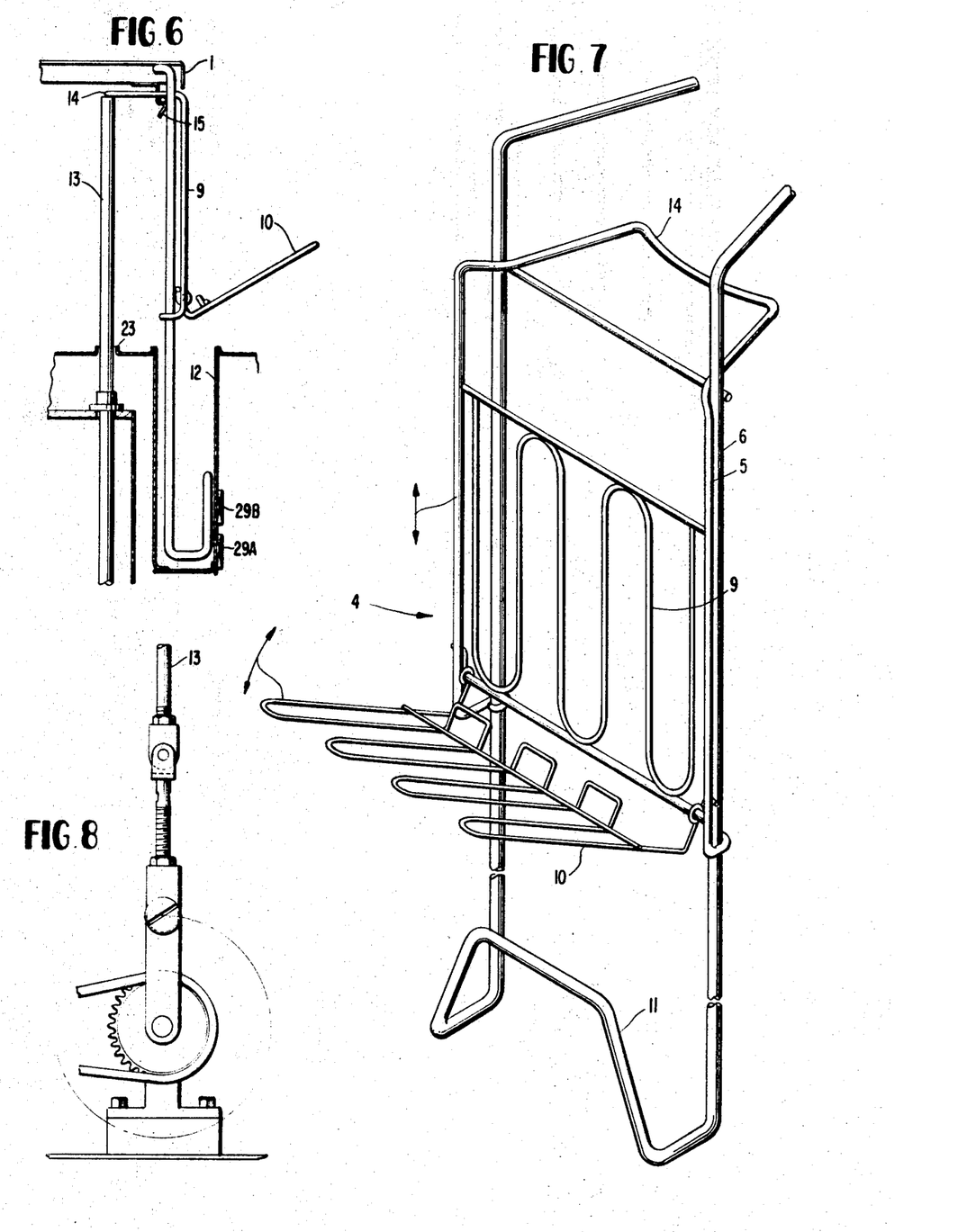
FIG. 6 is a sectional elevation view of the rider assembly, guide rod assembly and push rod taken along line 6—6 of FIG. 3.
FIG. 7 is a perspective view of the rider assembly and the guide rod assembly of the present invention.
FIG. 8 is a detailed elevation view of the push rod of the present invention.

The food rack 4 which can be seen in a sectional plan view in FIG. 4 and in perspective in FIG. 7 is composed of two faces, one of said faces 9 being fixed to the rider assembly 5 in a substantially vertical position and the other face 10 being hinged to the rider assembly in a manner such that in the open position the hinged face of the food rack 10 extends away from its vertical face 9. Each rider assembly is slidably mounted to two guide rods 6 which combine to form a reversing or hooklike portion 11 which extends into the cooking well. Accordingly, as the rider assembly is lowered into the cooking well, the extended face of the food rack first engages the upper side of the cooking well 12, see FIG. 6, and partially closes and further engages the hooklike reversing portion of the two guide rods which forces said extended face completely closed into close proximity to the fixed vertical arm of the food rack, thereby holding a portion of meat therebetween. The meat is then conveyed in a circular path through the cooking liquor until it is removed, for example, by the systematic vertical operation of the push rod 13 which engages the upper, substantially horizontal arm 14 of the rider assembly containing the food rack and raises it from the cooking liquor. Alternately, a guide ramp (discussed below) can be effectively used to provide the same function. As the rider assembly is removed from the cooking well, the extended face 10 of the food rack which was held in the closed position in the cooking well begins to open as it gradually clears the reversing portion 11 of the two guide rods and then completely opens after it has completely cleared the upper side 12 of the cooking well.

Figures 10, 10A, 11:
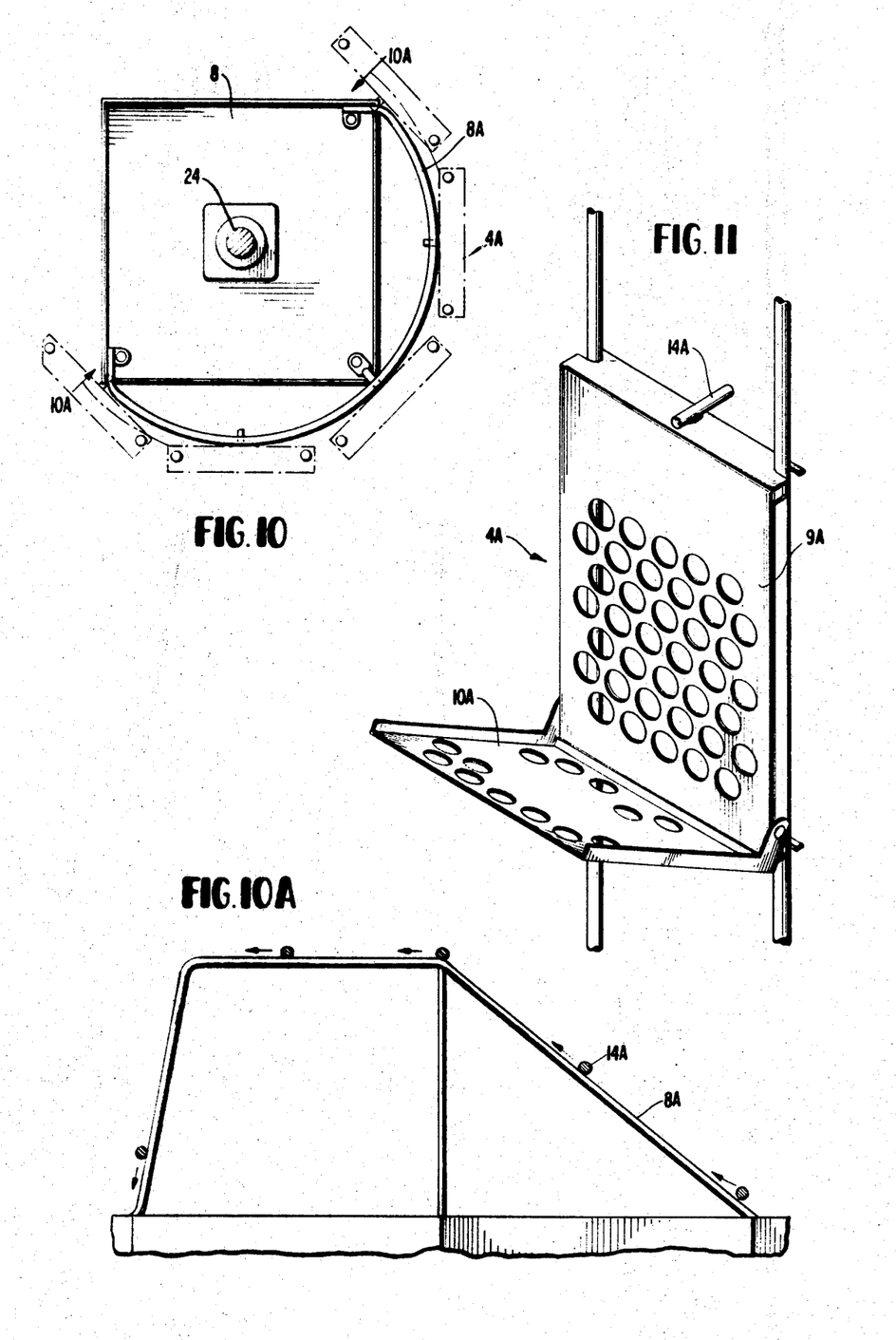
FIG. 10 is a fragmentary top view similar to FIG. 4 with some of the parts removed for purposes of clarity, showing the use of a guide ramp for removing the food racks from the cooking well.
FIG. 10A is a developed section taken along line 10A—10A of FIG. 10.
FIG. 11 is similar to FIG. 7, showing another embodiment of the food rack used in the present invention.

In FIG. 11, the food rack 4A is designed as two perforated plate faces 9A and 10A adapted to the guide rod assembly. The perforated food rack 4A can be readily substituted for the serpentine configuration 4 illustrated in FIG. 7. When the push rod 13 is used for raising the food racks from the cooking well, the horizontal arm of the rider assembly is effectively used in cooperation therewith, However, when a guide ramp 8A is used for raising the food racks from the cooking well, either the horizontal arm of the rider assembly or a ramp pickup 14A is utilized. The ramp pickup can be located anywhere along the top of the food rack 9A, for example at the end of said rack or preferably centered with respect thereto.

The food rack is held in the raised position, for example, by a spring clip 15 associated with the top of the carrousel which engages the upper arm 14 of the rider assembly (see FIG. 2). The cooked food can then be removed from the food rack and replaced with a fresh portion of preferably frozen raw meat. The rider assembly is then manually released from the spring clip 15 and lowered into the cooking well. Alternately, the rider assembly can be automatically raised from and lowered into the cooking well if the guide ramp 8A is used for raising and lowering the food rack, thereby eliminating the push rod assembly and the use of spring clip 15.

The guide ramp, see FIGS. 10 and 10A, generally comprises a guide element, for example, a wire which is adapted to engage the upper portion of the rider assembly, for example, horizontal arm 14 or ramp pickup 14A. The guide ramp begins to rise above the surface of the tank tray 8 in the general area of the right rear portion of the tray, reaches its maximum height in the vicinity of the right front portion of the tank tray and eases back to the surface of the tank tray in the vicinity of the left front portion of the tray. Thus, as the carrousel turns, the horizontal arm 14 or ramp pickup 14A engages the guide ramp at the right, rear portion of the tank tray, and begins to lift the food rack in a gradual incline from the cooking well. This incline should not be greater than about 40° to smooth operation as the rider assembly is raised from the cooking well. When the food rack reaches the right, front portion of the tray it is completely out of the cooking liquor and remains there until it approaches the left, front portion of the tray where it can be either eased back into the cooking liquor in a gradual decline of the guide ramp or merely dropped into the cooking liquor at about a 90° angle. Although the tank tray 8 can be round, square or some other configuration, the guide ramp must be basically in a round configuration since the food racks turn in a circle. As can be readily seen from FIG. 10 and 10A, the guide ramp can be adapted to the tank tray in any manner which is effective in removing the food racks from the cooking well to permit removal of the food and reloading, if desired. In another embodiment, the wire ramp can be provided in the cooking well and adapted to engage a pickup arm disposed on the bottom of the food racks.

Figure 3:
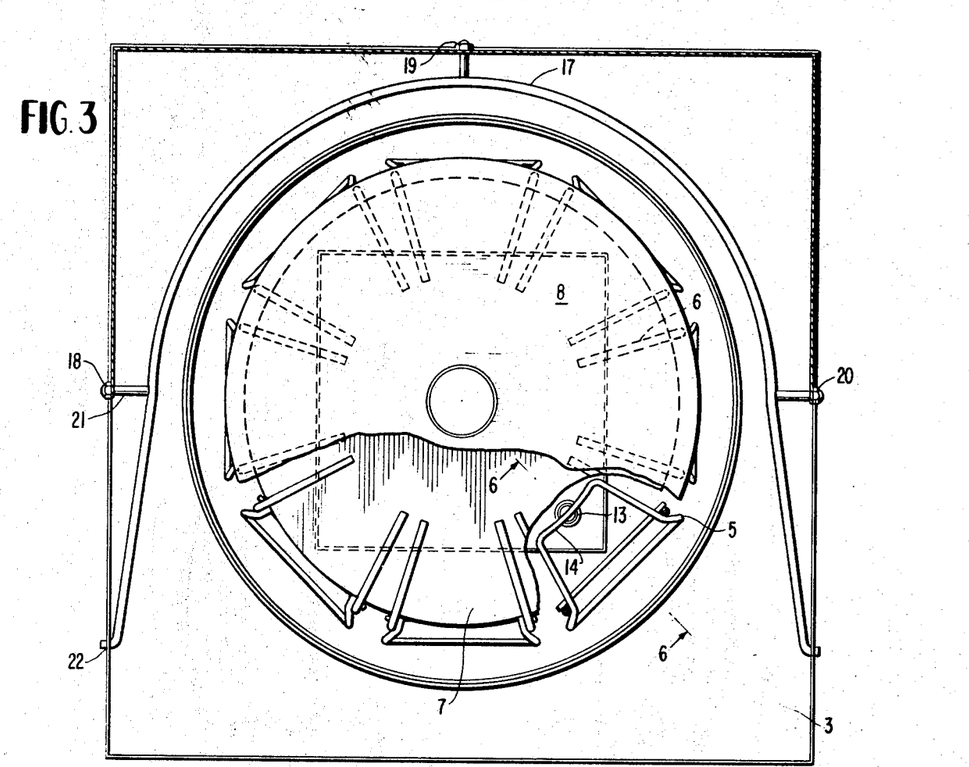
FIG. 3 is a sectional plan view of the carrousel assembly of the apparatus of the present invention taken along line 3—3 of FIG. 2.

To prevent the extended face of the food rack from hitting a hood 16 which encloses a portion of the carrousel, guide ring 17 (see FIG. 3) is attached to said hood at points 18, 19 and 20 and is extended therefrom by structural elements 21. Thus as the extended face of the food rack strikes the guide ring, the food rack is sufficiently closed so that it does not hit the hood. The guide ring, is also attached to oversize holes 22 in the upper portion of the cabinet table 3, said holes acting as an overflow drain for the cooking liquor which could be spilled on the table 3. Additionally, the guide ring also performs the function of holding the hood to the cabinet.

The rider assembly for each food rack is systematically removed from the cooking liquor by, for example, the push rod 13. The push rod shown in FIG. 8 operates like an eccentric and slides along the upper portion 14 of the rider assembly as the carrousel turns. The upper portion of the rider assembly has a radius of curvature which enables the push rod to slide along its substantially horizontal surface from one end to the other.

As will be readily noted, two guide rods are required for each rider assembly. Although the guide rods are in a fixed relationship during operation, and can be permanently secured to the carrousel top, said rods are preferably attached such that they can be removed from the slots provided for them in the carrousel top, for cleaning purposed. Similarly, the rider assembly can be disengaged from the guide rods for cleaning purposes.

The tray 8 is provided with lips 23 at the main drive shaft 24 and push rod 13, lips 25 at the outer periphery of the tray and lips 26 at the periphery of the aperture provided in the upper portion of the cabinet table. These lips extend above the tray and thereby prevent spillage of the cooking liquor from running back into the cooking well. Advantageously, the lips in the outer periphery of the tray are higher than those at the main drive shaft and push rod, so that in an emergency flooding condition the liquor would drain into the center of the tray and not into the cooking liquor well.

A thermostat sensing bulb 27 can be provided at any location in the cooking liquor for sensing the temperature of said liquor. However, according to a preferred embodiment of the present invention, the thermostat sensing bulb is advantageously disposed in a thermowell 28 which is located in the cooking well near where frozen food is initially introduced into the cooking liquor so that the thermostat can rapidly sense temperature drops from the input of the frozen food into the cooking liquor. The control circuit includes a two stage thermostat and a proportional timer control to maintain the temperature of the cooking liquor over the full range of no cooking to cooking at full capacity. In a less sophisticated embodiment a single stage thermostat can be used. The thermostat, proportional timer control, fuses and other electrical components are located in the cabinet 27A below the cooking well.

The temperature of the cooking liquor which is sensed by the thermostat sensing bulb is relayed to a temperature control circuit which in the embodiment shown in FIG. 2 is composed of two separate, circular strip heating elements 29A and 29B which are disposed around the outside of the cooking well and heat the contents of said well by conduction of heat through its walls. One or both of these heating elements could equally well be attached to the bottom of the cooking well or immersed directly in the cooking liquor.

The heating operation is composed of three separate phases. In phase 1, both of the heating elements, that is 29A and 29B, are turned on full to bring the cooking liquor up to the operating or cooking temperature. This phase is initiated by turning on the heater switch 46 which also lights the "on" light 49. As the cooking liquor approaches its operating temperature, Phase II is initiated wherein heating element 29B is switched from 240 a.c. operation to 120 a.c. operation by a relay 49. Heating element 29B is now operating at one quarter of its rated wattage (3,000 watts) or 750 watts. When Phase II is initiated the ready light 44 is turned on indicating the cooking apparatus is now ready for use. Finally as the temperature continues to rise slowly, Phase III is attained wherein the proportional timer 43 is activated and heating element 29A begins cycling on and off at a rate which is factory calibrated such that the combination of heat added by elements 29A and 29B during Phase III operation is just equal to the heat losses of the cooking apparatus under idle, "no cooking", conditions. As such, the temperature will be maintained at approximately 205° F. over long periods of idle time with very little variation. The factory calibrated cycling rate of the proportional timer 43 might be, for example, 15 seconds on and 15 seconds off. During Phase III the temperature of the cooking liquor is maintained without meat being introduced thereto, although it is possible to cook several sandwich portions of meat per hour under such conditions. To complete all possible modes, Phase IV is defined as the off condition when the heater switch 46 is switched off resulting in the "on" light 50 and "ready" light 44 going out and the switching relay and heaters all being deactivated.

As the apparatus is called on to cook, the temperature will drop at a rate defined by the quantity and time interval at which frozen food is introduced into the cooking liquor. When the thermostat senses a temperature drop equal to the second stage differential, it switches back to Phase II operation. If the cooking load approaches the machines capacity, the temperature will continue to drop. When it drops through the thermostat interstage and first stage differential, it switches back to Phase I operation herein both heating elements are operating at full capacity of 3,000 watts each. A unique and desirable feature of the present invention is that the heaters stay both electrically and physically warm during all operational phases. Accordingly, the response time of the electric heaters, normally relatively slow, is improved substantially. At the same time the thermal overshoot, which is often a problem with electric heaters, is minimized through the use of multistage operation and proportional timer control.

The heating system described above using two 3,000 watt 2 inches wide heating elements is given as being illustrative of the preferred method of controlling the temperature of the cooking liquor according to the present invention. It is apparent that any number of strip heaters with various wattage combinations can be effectively used and controlled in any desired manner or combination to effect the required heating operation. For example, it is possible to use two strip heaters in a different heating sequence or to use less than or more than two heating elements to achieve the necessary heating conditions, such as a single 3,000 watt 3 inch wide heating element, four 1,500 watt 1½ inch wide heating elements or a 3,000 watt 2 inch and two 1,500 watt 1½ inch heating elements with various combinations of single or double stage thermostats, proportional timers, contactors, and switching relays.

When using three heating elements comprising, for example, three separate 2,000 watt heating elements, the heating operation can also be composed of three separate phases. In Phase I, all of the heating elements are turned on full to bring the cooking liquor up to the operating or cooking temperature. As the cooking liquor approaches its operating temperature, Phase II is initiated wherein the first heating element is turned off and a second heating element begins to cycle. Finally, Phase III is begun wherein the third heating element is turned off. At this point both the first and the third heating elements are turned off, the second heating element is cycling and the ready light is turned off, the second heating element is cycling and the ready light is turned on indicating that the cooking apparatus is now waiting for use. During Phase III, the temperature of the cooking liquor is maintained without meat being introduced thereto, although it is possible as in the two heating element systems, to cook several sandwich portions of meat per hour under such conditions.

As the apparatus is loaded with food, the first and third heating elements will again begin operating, as needed, to maintain the cooking liquor at its desired cooking temperature. Here again, since one of the heating elements is always cycling, said element is not permitted to become cold and accordingly, the response time for bringing the cooker to partial or full operation is very fast.

According to the present invention, it is also possible to locate immersion type heating elements in the cooking liquor thereby directly heating the cooking liquor in response to the temperature sensed therein. Although electrical heating is utilized in the embodiments shown, it is apparent that other types of heating, for example gas heating, would be effective.

Figure 5:
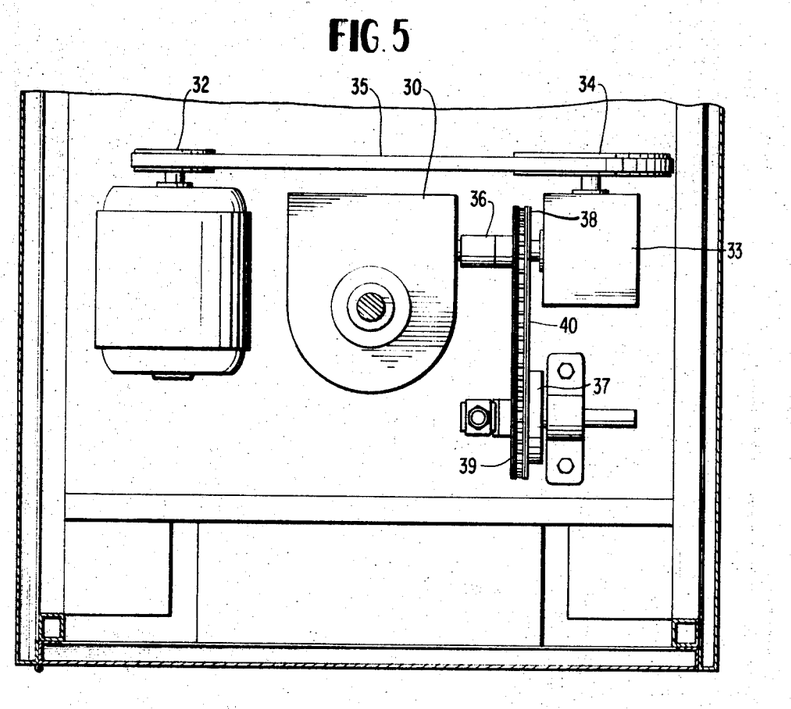
FIG. 5 is a sectional plan view of the power supply of the apparatus of the present invention taken along line 5—5 of FIG. 2.

As stated above, and seen in FIG. 5, the lower portion of the cabinet also houses the necessary elements for rotating the carrousel, and raising and lowering the rider assembly containing the food rack when a push rod is used. The carrousel containing the food rack is attached to an axially disposed main drive shaft which extends the entire height of the apparatus and terminates in a conventional angle drive transmission 30 disposed in the lower portion of the cabinet. The main drive shaft is driven by a motor 31 through said transmission. The motor, which contains a motor pulley 32 drives an angle drive reducer 33 which similarly contains a reducer pulley. The motor pulley is connected to the reducer pulley by a belt drive 35. The energy produced by the motor is transferred to the angle drive reducer by the belt drive 35 which is attached to the motor pulley and the reducer pulley. The angle drive reducer in turn relays said energy to the angle drive transmission for driving the main drive shaft through a coupler shaft 36. The motor can be, for example, a fractional horsepower polyspeed motor, or a variable speed accomplished by a compound pulley system utilizing a fixed speed motor, although a one-eighth H.P. direct drive fixed speed motor has been found to be particularly effective.

The angle drive reducer also communicates with a jack shaft chain and sprocket assembly 37 which operates the push rod 13 for raising the rider assembly from the cooking liquor. More specifically, the coupler shaft 36 of the angle drive reducer 33 is provided with a chain sprocket 38 which communicates with a chain 39 of the jack shaft assembly via a chain belt 40. Thus the energy produced by the motor not only drives the main drive shaft and the carrousel attached thereto but also transfers its energy to the jack shaft assembly for operating the push rod as an eccentric in up and down vertical strokes.

The speed of rotation of the carrousel can be changed by changing the motor-reducer pulley combination. Thus, an adjustable compound pulley arrangement can be provided wherein the size of the pulleys is adjustable. Also, the speed of the motor can be electrically varied through the use of a solid state controller. The on-off switch for the motor is element 41 in the cabinet.

Figure 9:
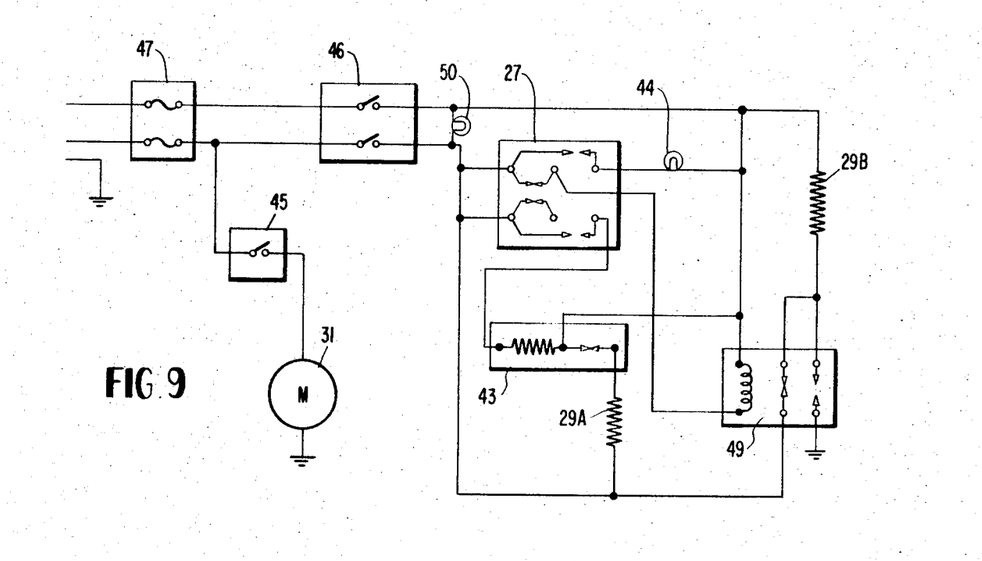
FIG. 9 is an electrical schematic of the electrical system including the heating system as used in the apparatus of the present invention.

The control circuit for the heating elements has a master on-off switch 46 which breaks both sides of a 240 volt, 60 cycle power input. The thermostat 27 is a two stage type with a 3° F. switch differential on each stage and an adjustable interstage differential from 3° F. to 10° F. In the present embodiment a factory set interstage differential of approximately 6° F. is being used. The thermostat has a single setting adjustable between about 160° F. and 260° F. In the present embodiment a factory setting of about 200° F. is being used. The thermostat stages are each single pole, double throw. On start up during Phase I, heater 29A is on through the normally closed contacts of the proportional timer while the other heater 29B is on through the normally open contacts of the switching relay which has been energized through the normally closed contacts of the first stage of the thermostat. When the temperature reaches the predetermined point of say 200° F., the first stage breaks one set of contacts dropping out the switching relay and thereby switching the heater 29B from 240 volt operation to 120 volt operation (750 watts). At the same time the first stage of the thermostat makes a set of contacts which lights the ready light 44. As the temperature increases further through the interstage and second stage switch differential, the second stage makes a set of contacts activating the proportional timer 43 initiating cycling of the other heater 29A. The proportional timer has normally made contacts attached to a bimetal. The bimetal is wrapped with a heater which when activated causes the bimetal to warp breaking the contacts. These contacts control the tank heater 29A as well as the internal cycle heater. Therefore, when the contacts are open, the cycle heater is off and it cools down, remaking the contacts and the cycle repeats itself. The relative on and off timing of the proportional timer is adjustable and is factory set to maintain the cooking liquor temperature when the machine is on standby. The control circuit is shown in detail in FIG. 9 illustrating the electrical schematic of the motor 31, the motor switch 45, the heater switch 46 and the fuse block 47 in combination with the heating elements and controls discussed above.

One of the features of the electrical circuit as designed is that it is capable of controlling and switching a total heater load of 6,000 watts without the use of a heavy duty contactor.

The cooking apparatus of the present invention is adaptable to a batch type operation as well as a continuous operation described above in which the food is continuously conveyed through the cooking liquor. Thus, for example, the meat portion can be merely immersed in the cooking liquor and removed when the meat is cooked and does not have to be rotated therethrough.

The cooking apparatus of the present invention can be in any desired shape. For example, the hood, the aperture in the top of the cabinet, the tray and the cabinet itself can be round, square, rectangular, etc., or any combination thereof. Furthermore, the cabinet of the cooking apparatus of the present invention is equipped with interchangeable side panels and ventilation holes can be provided in the back panel of the cabinet, where necessary, to ventilate the motor and the heater area. Also, drain means 48 containing ball valves can be provided for removing the cooking liquor from the cooking well through the bottom of the cabinet. Alternatively a tank drain can be horizontally channeled to the side or back of the cabinet.

The apparatus is constructed of conventional materials, for example, the top of the carrousel can be made of stainless steel or aluminum and the food racks can be nickel plated. In the embodiment shown eight food racks are provided in the carrousel. However, it is apparent that the cooking apparatus could be readily designed to accommodate a large or small number of racks. The cabinet can also sit on casters for easy movement of the apparatus.

The food cooking apparatus of the present invention is virtually maintenance-free, requiring only a 240 a.c. 30 amp outlet for operation and normal maintenance. The cooking liquor should be periodically drained and washed out and in the event service is needed, the entire machine can be completely disassembled without the need of special tools or special skills. Because of its compact and unique design no special ducting is necessary as is normally required and associated with the prior art cooking devices.

The invention being thus described, it will be obvious that the same may be varied in many ways. Such variations are not to be regarded as a departure from the spirit and scope of the invention, and all such modifications as would be apparent to one skilled in the art are intended to be included.

We claim:

1. A cooking apparatus which comprises a cabinet provided with an aperture in the upper surface thereof, said aperture containing a centrally disposed tray, the walls of said tray and said aperture defining a cooking well which is adapted to contain a cooking liquor and which extends below said upper surface, a conveying means mounted for movement relative to said cabinet and extending above said upper surface, at least one food rack means supported by said conveying means and adapted to be lowered into and raised from the cooking well, said food rack means being composed of two faces, one of said faces being fixed and the other of said faces being hinged with respect to said fixed face, means for raising the food rack means from the cooking well, and means for moving the conveying means containing said food rack.

2. The apparatus of claim 1, wherein heating means are associated with the cooking well.

3. The apparatus of claim 2, wherein heat-sensing means are provided in or attached to the cooking well, said heat-sensing means controlling the heating means.

4. The apparatus of claim 1, wherein the conveying element is moved by a motor means which communicates with said conveying element.

5. The apparatus of claim 4, wherein the means for raising the food rack means from the cooking well is a push rod which is driven by said motor means in communication therewith.

6. The apparatus of claim 4, wherein the means for raising the food rack means from the cooking well comprises a ramp means, said ramp means being adapted to engage an extended element associated with the food rack means as it moves with the conveying means.

7. The apparatus of claim 1, wherein the conveying means is a carrousellike element rotatably mounted in the cabinet.

8. The apparatus of claim 7, wherein a guide rod assembly is provided for each of the food racks said guide rod assembly being secured to the upper portion of the carrousellike element and extending into the lower portion of the cooking well, each of the food racks being attached to a rider assembly which is slidably mounted to said guide rod assembly.

9. The apparatus of claim 8, wherein each guide rod assembly comprises two guide rods, one end of said guide rods being secured to the upper portion of the carrousel, and the other end of said guide rods combining to form a reversing portion which extends into the cooking well and is adapted to receive the rider assembly and hold the food rack closed.

10. The apparatus of claim 8, wherein the food rack forms part of the rider assembly and is composed of two faces, one of said faces being fixed to the rider assembly and the other face being hinged to the rider assembly such that in the loading position the hinged face extends away from the fixed face.

11. The apparatus of claim 10, wherein the faces of the food rack have a serpentine structural configuration.

12. The apparatus of claim 10, wherein the faces of the food rack have a horizontal or vertical structural configuration.

13. The apparatus of claim 10, wherein the faces of the food rack are perforated plates.

14. The apparatus of claim 10, wherein a hood guide ring extends around a substantial portion of the carrousellike conveying element and is disposed such that the hinged extending face of the food rack, during its rotation in the raised position, engages said hood guide ring and is at least partially closed by said guide ring.

15. The apparatus of claim 7, wherein the carrousellike element is rotated by a motor means which drives a main drive shaft which is attached at one end to said carrousellike element and at the other end to transmission means, said motor means transferring its energy to the main drive shaft through said transmission means.

16. The apparatus of claim 15, wherein the motor means also transfers its energy to a push rod which provides a means for raising the food rack from the cooking well.

17. The apparatus of claim 1, wherein the cooking well is provided with at least one heating means which is annularly disposed on the outer surface of the cooking well.

18. The apparatus of claim 1, wherein the cooking well is provided with at least one heating means which communicates with the bottom of said cooking well.

19. The apparatus of claim 1, wherein the means for raising the food rack means from the cooking well comprises a ramp means which rises from the surface of the tray and returns to said surface, said ramp means being adapted to engage an extended element associated with the food rack means as it moves with the conveying means.

20. A cooking apparatus which comprises a cabinet provided with an aperture in the upper surface thereof, said aperture containing a centrally disposed tray, the walls of said tray and said aperture defining a cooking well which is adapted to contain a cooking liquor and which extends below said upper surface, a carrousellike element rotatably mounted in the cabinet and extending above said upper surface, said carrousellike element being attached to an axially disposed main drive shaft which is driven by and communicates with a motor means disposed in the cabinet, a plurality of guide rod assemblies secured to the upper portion of the carrousellike element and extending into the lower portion of the cooking well, a rider assembly slidably mounted to each guide rod assembly for substantially vertical motion relative to the carrousellike element and adapted to be lowered into and raised from the cooking well, said rider assembly containing a food rack associated therewith, push rod means mounted in the cabinet for substantially vertical operation, said push rod communicating with and being driven by said motor means and adapted to engage the upper portion of the rider assembly for raising said assembly containing the food rack from the cooking well, and heating means associated with the cooking well for heating the cooking liquor.

21. The apparatus of claim 20, wherein the aperture in the upper surface of the cabinet is round and the centrally disposed tray is square.

22. The apparatus of claim 21, wherein the peripheral portions of the aperture and the tray which define the upper edge of the cooking well are provided with lips which extend above the upper surface of the cabinet to prevent spillage of the cooking liquor from flowing back into the cooking well.

23. The apparatus of claim 22, wherein the main drive shaft extends from the cabinet through the tray and terminates in the upper portion of the carrousellike element, said tray being provided with lips at the main drive shaft which extend above the upper surface of the cabinet but do not extend as high as said other lips around the cooking well.

24. The apparatus of claim 20, wherein the aperture in the upper surface of the cabinet is round and the centrally disposed tray is round.

25. The apparatus of claim 20, wherein the carrousellike element is provided with a hood which extends at least a portion of the way around said carrousellike element.

26. The apparatus of claim 25, wherein said hood is attached to a guide ring which is spaced from and extends around a substantial portion of the carrousellike element, said guide ring also holding the hood to the cabinet.

27. The apparatus of claim 25, wherein the guide ring is secured to the upper portion of the cabinet through an enlarged hole which also functions to drain said upper portion of the cabinet from cooking liquor spillage.

28. The apparatus of claim 20, wherein the upper portion of the carrousellike element is provided with a hook or spring clip for each rider assembly, said hook or spring clip receiving the rider assembly from the push rod and holding said rider assembly in a raised position.

29. The apparatus of claim 28, wherein the rider assembly has a substantially horizontal upper portion which is engaged by the push rod.

30. The apparatus of claim 29, wherein the food rack forms part of the rider assembly and is composed of two faces, the first of said faces being fixed to the rider assembly in a substantially vertical position and the second of said faces being hinged to the lower end portion of said rider assembly, such that in the loading position the hinged face extends away from the fixed face.

31. The apparatus of claim 30, wherein the heating means comprises a plurality of individual heating elements annularly disposed around the outside surface of the cooking well, each of said heating elements being individually and selectively controlled in response to a thermostat sensing means which is disposed in the cooking well in the area where the food is first introduced into the cooking liquor of said cooking well.

32. The apparatus of claim 31, wherein two heating elements are utilized and a control means is provided for applying an energizing potential to said two heating elements, said control means being operative to change the output wattage of one of said heating elements upon a detection of a temperature of the cooking liquor in excess of a first predetermined temperature, the apparatus further including a proportional timing means activated upon the detection of a temperature increase in excess of a second predetermined temperature to cause the other said heating element to operate intermittently in a predetermined time sequence.

33. The apparatus of claim 32, wherein the intermittent time sequence is calibrated such that the heat added by the heating elements equals the apparatus and cooking liquor heat losses during standby operation.

34. The apparatus of claim 32, wherein the heating elements are first and second heating elements, the first heating element being the element which is switched in wattage, the second heating element being the intermittent-operating heating element, the switching of the first heating element being simultaneous with energizing the ready light.

35. The apparatus of claim 32, wherein each of said heating elements has a power of 3,000 watts.

36. The apparatus of claim 31, wherein four heating elements are utilized, each of said elements having a power of 1,500 watts.

37. The apparatus of claim 30, wherein three heating elements are utilized and a control means is provided for applying an energizing potential to said three heating elements, said control means being operative to deactivate one of said three heating elements upon a detection of a temperature of the cooking liquor in excess of a first predetermined temperature, the apparatus further including a proportional timing means activated upon the detection of a temperature increase to a level in excess of a second predetermined temperature to cause another of said three heating elements to operate intermittently in a predetermined time sequence while the third of said three heating elements is simultaneously deactivated.

38. The apparatus of claim 37, wherein each of said heating elements has a power of 2,000 watts.

39. The apparatus of claim 37, wherein one of said heating elements has a power of 3,000 watts and the other two heating elements have a power of 1,500 watts.

40. The apparatus of claim 20, wherein the main drive shaft extends substantially the entire height of the cooking apparatus and is secured to the carrousellike element at one end and terminates in an angle drive transmission at the other end, said motor means transferring energy to the angle drive transmission through an angle drive reducer.

41. The apparatus of claim 40, wherein the angle drive reducer also communicates with a jack shaft chain and sprocket assembly which operates the push rod for raising the rider assembly from the cooking well.

42. The apparatus of claim 20, wherein a single heating means is used with a power of 3,000 watts.

43. A cooking apparatus which comprises a cabinet provided with an aperture in the upper surface thereof, said aperture containing a centrally disposed tray, the walls of said tray and said aperture defining a cooking well which is adapted to contain a cooking liquor and which extends below said upper surface, a carrousellike element rotatably mounted in the cabinet and extending above said upper surface, said carrousellike element being attached to an axially disposed main drive shaft which is driven by and communicates with a motor means disposed in the cabinet, a plurality of guide rod assemblies secured to the upper portion of the carrousellike element and extending into the lower portion of the cooking well, a rider assembly slidably mounted to each guide rod assembly for substantially vertical motion relative to the carrousellike element and adapted to be lowered into and raised from the cooking well, said rider assembly containing a food rack associated therewith, ramp means which rises from the surface of the tray and returns to said surface, said ramp means being adapted to engage the upper portion of the rider assembly as it moves with the carrousellike element and heating means associated with the cooking well for heating the cooking liquor.

44. The apparatus of claim 43, wherein the rider assembly has a substantially horizontal upper portion which is engaged by the ramp means.